T. HOWARTH & J. V. MUSGRAVE.
COMBING MACHINE.
APPLICATION FILED OCT. 2, 1915.
1,181,890.
Patented May 2, 1916.
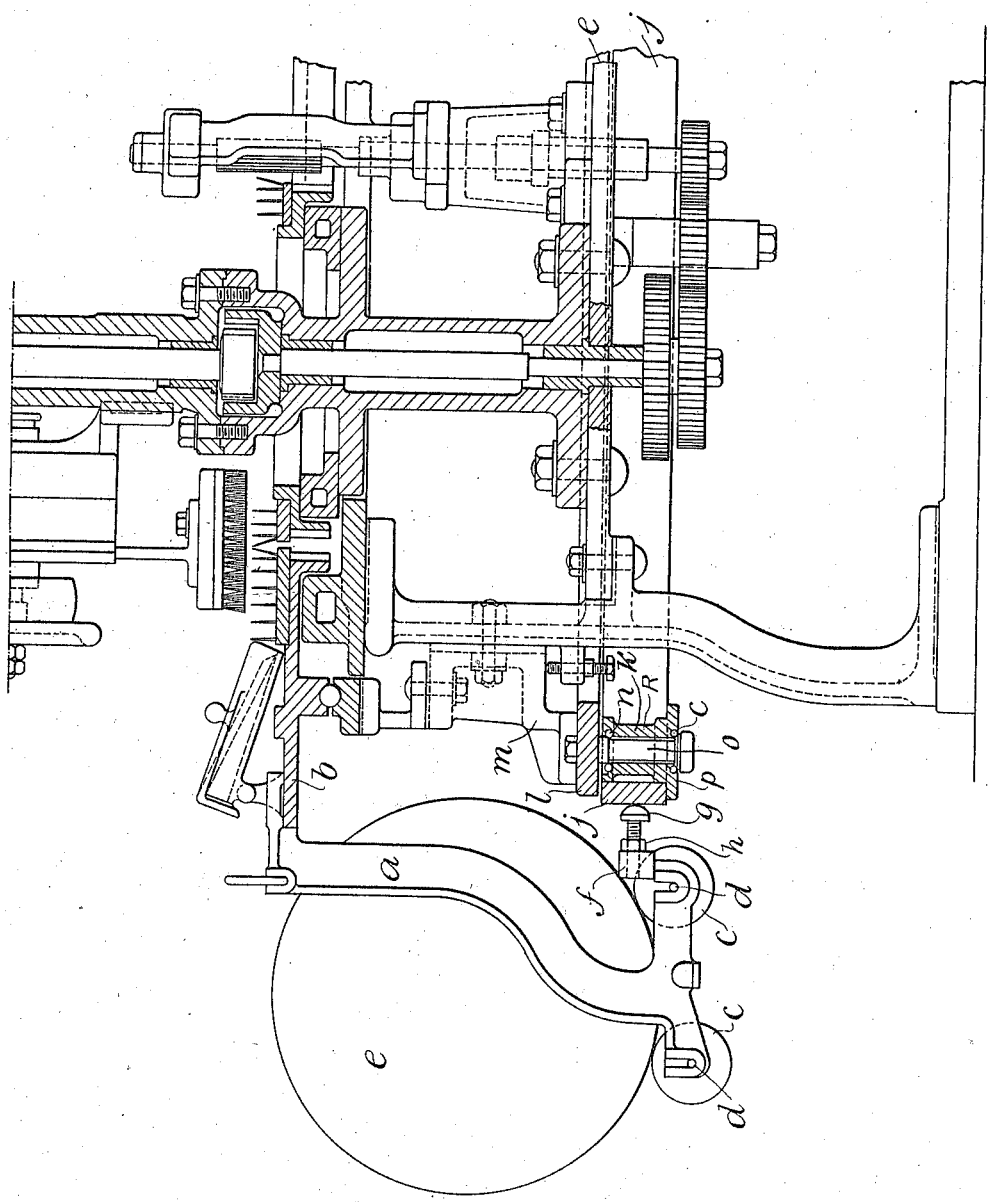
Witnesses:
Inventors
Thomas Howarth
John V. Musgrave
by
James L. Norris,
Attorney

UNITED STATES PATENT OFFICE.

THOMAS HOWARTH AND JOHN VARLEY MUSGRAVE, OF BRADFORD, ENGLAND.

COMBING-MACHINE.

1,181,890.  Specification of Letters Patent.  Patented May 2, 1916.

Application filed October 2, 1915. Serial No. 53,805.

*To all whom it may concern:*

Be it known that we, THOMAS HOWARTH and JOHN VARLEY MUSGRAVE, subjects of the King of Great Britain, residing at Atlas Mills, Longside Lane, and 57 Cottam Terrace, Legrams Lane, in the city of Bradford, England, respectively, have invented certain new and useful Improvements in Combing-Machines, of which the following is a specification.

This invention relates to improved ball carrying devices employed in Noble's or like combing machines.

Previously the balls to be combed have been placed on pairs of carrying rollers which are mounted in bearings on depending brackets fixed to the rack plate of the machine. Only balls of a certain size and weight have been able to be employed in consequence of the great strain placed on the aforesaid carrying rollers and brackets.

The object of this invention is to provide an improved ball carrying device whereby larger balls may be employed than have hitherto been practicable.

According to this invention one or more studs or the like is provided on each of the ball carrying brackets in such a manner that the studs are adapted to press or bear against a ring rotatably mounted on the frame of the machine.

Referring now to the accompanying drawing which shows one form of ball carrying device made in accordance with this invention. The invention is here illustrated as applied to a Noble's combing machine but the entire mechanism of the machine is not shown on the drawings nor referred to in the description, but only so much as is necessary to the understanding of the invention.

The ball carrying bracket $a$ which is suspended from the rack plate $b$ is provided with a pair of carrying rolls $c, c$, mounted in bearings $d, d$; $e$ is the ball of material to be combed.

At the inner end of the bracket $a$ is fixed a lug $f$ into which a stud $g$ provided with a curved face is screwed. The shank of the stud is constructed of such a length that the stud may be extended beyond the bracket $a$ to any desired distance.

$h$ is a lock nut provided on the shank of the stud $g$.

Any desired form of stud or the like may be employed.

The studs $g$ are adapted to abut against a rotation ring $j$ which is carried on a series of friction rollers $k$ supported from a circular ring $l$ mounted on the frame $m$ of the machine. Each friction roller $k$ is preferably mounted on ball bearings $n$ on a spindle $o$ supported from the circular ring $l$ and $p$ is a flange or disk greater in diameter than the roller $k$, provided on the spindle $o$ in order to support the rotation ring $j$.

The lug $f$ may be cast upon the bracket $a$ or fixed thereto in any suitable manner. The ball carrying bracket $a$ is rotated in a suitable manner.

In use, the pressure of the ball $e$ on the carrying bracket $a$ causes the stud $g$ to press against the rotation ring $j$ and as the bracket revolves the rotation ring $j$ is rotated against the friction rollers $k$ by the pressure of the stud $g$ thereagainst.

This invention can be adapted to existing types of Noble's combing machines with very little cost.

With a ball carrying device made in accordance with this invention, the weight of the material to be combed is distributed between the rack $b$ and the rotation ring $j$ as the arms $a$, which hold the weight of the material $e$ to be combed, press against the rotation ring $j$ thereby preventing breakage of the arms which is very common with the old method as they are only suspended from the rack $b$ at the top and unsupported at the bottom consequently a great saving is effected in repairs over the old method.

A combing machine fitted with a device made in accordance with this invention will run double the period of time before it requires a fresh supply of material to be combed. It will require only half the number of balls to be prepared for it as the same will be double the weight thereby saving a great amount of labor and time. There will be much less waste and consequently better work, besides making the work easier for the attendant.

What we claim is:—

1. In combination with a ball carrying device of combing machines, of studs projecting from each carrying device, and a movable member mounted on the frame of the machine, said studs being adapted to bear against said movable member.

2. In combination with a ball carrying bracket of a combing machine, of a stud projecting from said bracket, and a rotatable member carried on anti-frictional means supported on the frame of the machine, said stud being adapted to bear against said rotatable member.

3. In combination with a depending movable supporting bracket, of a stud projecting from said bracket at a lower portion thereof, and a movable member mounted on the frame of the machine, said stud being adapted to bear against said movable member.

4. In combination with a revoluble ball carrying bracket of combing machines, of an adjustable stud carried by and projecting from said bracket, and an annular member rotatably mounted on the frame of the machine concentric with the path of rotation of said bracket, said stud being adapted to bear against said annular member.

In testimony whereof we have hereunto set our hands in presence of two subscribing witnesses.

THOMAS HOWARTH.
JOHN VARLEY MUSGRAVE.

Witnesses:
GEORGE EDWARD ROBINSON,
SLATER RAYNER.

Copies of this patent may be obtained for five cents each, by addressing the "Commissioner of Patents Washington, D. C."